US011308317B2

(12) United States Patent
Choi et al.

(10) Patent No.: US 11,308,317 B2
(45) Date of Patent: Apr. 19, 2022

(54) ELECTRONIC DEVICE AND METHOD FOR RECOGNIZING CHARACTERS

(71) Applicant: Samsung Electronics Co., Ltd., Suwon-si (KR)

(72) Inventors: Juyong Choi, Suwon-si (KR); Jinhyun Kim, Suwon-si (KR); Misu Kim, Suwon-si (KR); Jeongin Choe, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/963,628

(22) PCT Filed: Feb. 18, 2019

(86) PCT No.: PCT/KR2019/001903
§ 371 (c)(1),
(2) Date: Jul. 21, 2020

(87) PCT Pub. No.: WO2019/164196
PCT Pub. Date: Aug. 29, 2019

(65) Prior Publication Data
US 2021/0064864 A1 Mar. 4, 2021

(30) Foreign Application Priority Data
Feb. 20, 2018 (KR) .................. 10-2018-0019847

(51) Int. Cl.
*G06F 17/00* (2019.01)
*G06K 9/00* (2022.01)
(Continued)

(52) U.S. Cl.
CPC ....... *G06K 9/00456* (2013.01); *G06F 40/123* (2020.01); *G06F 40/40* (2020.01);
(Continued)

(58) Field of Classification Search
CPC ... G06F 40/40; G06F 40/123; G06K 9/00456; G06K 9/20; G06K 2009/2045;
(Continued)

(56) References Cited

U.S. PATENT DOCUMENTS 9,514,376 B2   12/2016   Cuthbert et al.
9,652,896 B1   5/2017    Jurgenson et al.
(Continued)

FOREIGN PATENT DOCUMENTS

JP    07-220025 A      8/1995
JP    2008-134683 A    6/2008
(Continued)

OTHER PUBLICATIONS

Extended European Search Report dated Feb. 24, 2021, issued in a counterpart European Application No. 19757504.6- 1207/3731142.
(Continued)

*Primary Examiner* — Laurie A Ries
(74) *Attorney, Agent, or Firm* — Jefferson IP Law, LLP

(57) ABSTRACT

An electronic device according to an embodiment disclosed in the present document may comprise: an imaging device for generating image data; a communication circuit; at least one processor operatively connected to the imaging device and the communication circuit; and a memory operatively connected to the processor, for storing a command.

12 Claims, 13 Drawing Sheets

(51) Int. Cl.
*G06F 40/40* (2020.01)
*G06F 40/123* (2020.01)
*G06K 9/20* (2006.01)
*H04N 5/77* (2006.01)

(52) U.S. Cl.
CPC .............. *G06K 9/20* (2013.01); *H04N 5/772* (2013.01); *G06K 2009/2045* (2013.01); *G06K 2209/01* (2013.01)

(58) Field of Classification Search
CPC .. G06K 2209/01; G06K 9/325; G06K 9/3258; H04N 5/772; H04N 5/225; H04N 5/77
See application file for complete search history.

(56) References Cited

U.S. PATENT DOCUMENTS

| | | | |
|---|---|---|---|
| 9,836,890 B2 | 12/2017 | Jurgenson et al. | |
| 9,996,760 B2 | 6/2018 | Kalyuzhny | |
| 10,102,680 B2 | 10/2018 | Jurgenson et al. | |
| 10,366,543 B1 | 7/2019 | Jurgenson et al. | |
| 2004/0101196 A1 | 5/2004 | Weitman | |
| 2006/0013444 A1* | 1/2006 | Kurzweil | G06F 40/194 382/114 |
| 2008/0119236 A1* | 5/2008 | Chen | H04M 1/72403 455/566 |
| 2010/0331043 A1* | 12/2010 | Chapman | H04W 4/50 455/556.1 |
| 2013/0198123 A1* | 8/2013 | Stadermann | G06K 9/00463 706/46 |
| 2013/0343652 A1* | 12/2013 | Goto | G06K 9/00442 382/182 |
| 2015/0310290 A1* | 10/2015 | Cuthbert | G06F 40/58 382/182 |
| 2017/0243371 A1 | 8/2017 | Jurgenson et al. | |
| 2017/0330048 A1* | 11/2017 | Kalyuzhny | G06K 9/00449 |
| 2018/0189592 A1* | 7/2018 | Annis | G06K 9/344 |
| 2018/0260376 A1* | 9/2018 | Newby | G06F 40/143 |
| 2019/0065877 A1* | 2/2019 | Kalyuzhny | G06K 9/00442 |

FOREIGN PATENT DOCUMENTS

| | | |
|---|---|---|
| KR | 10-2003-0024786 A | 3/2003 |
| KR | 10-2015-0088001 A | 7/2015 |
| KR | 10-1758712 B1 | 7/2017 |
| WO | 2015/165524 A1 | 11/2015 |

OTHER PUBLICATIONS

Iwata Seiya et al: "Recognition and connection of moving captions in Arabic TV news" 2017 1st International Workshop on Arabic Script Analysis and Ecognition (ASAR), IEEE, Apr. 3, 2017, pp. 163-167, XP033164950.

* cited by examiner

610

```
Think of me
Think of me fondly when we've said goodbye
Remember me once in a while, please promise me you'll try
When you find that once again you long to take your heart
back and be free...

If you ever find a moment, spare a thought for me

We never said our love was evergreen
```

FIG.6A

```
                              610
                               )
        ┌──────────────────────────────────────────────┐
        │ Think of me                                   │
 622 ─── │[Think of me fondly when we've said goodbye]  │
        │ Remember me once in a while, please promise me you'll try │ ─── 621
        │ When you find that once again you long to take your heart │
 623 ─── │[back] and be free...                          │
        │                                              │
        │ If you ever find a moment, spare a thought for me │
        │                                              │
 624 ─── │[We] never said our love was evergreen         │
        └──────────────────────────────────────────────┘
```

FIG.6B

ELECTRONIC DEVICE AND METHOD FOR RECOGNIZING CHARACTERS

TECHNICAL FIELD

Embodiments disclosed herein relate to character recognition technology.

BACKGROUND ART

Optical character recognition (OCR) refers to a technology for converting characters written by a person by hand or printed by a machine into data recognizable by an electronic device (e.g., a smart phone). For example, when the electronic device faces a signboard, the electronic device may recognize characters written on the signboard through the OCR technology.

The OCR technology may be classified into an embedded OCR technology performed in an electronic device and a server OCR technology performed in a server. In the embedded OCR technology, a processing speed is fast, but accuracy may be deteriorated due to limitations in performance of the electronic device. On the other hand, in the server OCR technology, the electronic device needs to transmit data to the server, leading to a low processing speed but achieving high accuracy.

DISCLOSURE

Technical Problem

Recently, as more number of users require sophisticated character recognition, interest and demand for the server OCR technology are also increasing. However, as mentioned above, in the server OCR technology, the processing speed may be slow because the electronic device needs to transmit data to the server. In particular, when there is a large amount of data, it may take a long time in recognizing characters.

Embodiments disclosed in the disclosure provide an electronic device for solving the above-described problems and problems raised in the disclosure.

Technical Solution

According to an embodiment disclosed herein, an electronic device may include an imaging device that generates image data, a communication circuit, at least one processor operatively connected to the imaging device and the communication circuit; and, a memory operatively connected to the processor to store instructions, wherein the instructions may cause, when executed, the processor to receive first image data including a first image from the imaging device, transmit the first image data to a first server through the communication circuit, receive first text data including a first text recognized from the first image data from the first server through the communication circuit, receive second image data including a second image including a part of the first image from the imaging device, and transmit the second text data including at least a part of the first text data and a part of the second image data, not all of the second image data to the first server through the communication circuit.

Further, according to an embodiment disclosed herein, a method for recognizing characters in an electronic device may include receiving first image data including a first image from the imaging device, transmitting the first image data to a first server through a communication circuit, receiving first text data including a first text recognized from the first image data from the first server through the communication circuit, receiving second image data including a second image including a portion of the first image from the imaging device, and transmitting the second text data including at least a part of the first text data and a part of the second image data, not all of the second image data, to the first server through the communication circuit.

Further, according to an embodiment disclosed herein, an electronic device may include a camera, a display that outputs an image recognized through the camera, a communication circuit that transmits the image to a first server, a processor electrically connected to the camera, the display, and the communication circuit; and a memory operatively connected to the processor to store instructions and an application for capturing the image, wherein the instructions may cause, when executed, the processor to capture a first image output through the display in response to a user input for executing the application, transmit the first image to the first server, receive a first text extracted from the first image from the first server and output the first text through the display, transmit, as first type data, a second text located on a region of a second image that overlaps the first image and including at least a part of the first text and transmit, as second type data, a region of the second image that does not overlap the first image to the first server when the second image including at least a part of the first image is output through the display, and receive a third text extracted from the first type data and the second type data from the first server and output the third text to the display.

Further, according to an embodiment disclosed herein, a method for recognizing characters in an electronic device may include capturing a first image output through a display in response to a user input for, transmitting the first image to a first server, receiving a first text extracted from the first image from the first server, outputting the first text through the display, transmitting, as first type data, a second text located on a region of a second image that overlaps the first image and including at least a part of the first text, transmitting, as second type data, a region of the second image that does not overlap the first image to the first server when the second image including at least a part of the first image is output through the display, receiving a third text extracted from the first type data and the second type data from the first server to output the third text to the display.

Advantageous Effects

According to the embodiments disclosed herein, it is possible to shorten a character recognition time.

In addition, various effects may be provided that are directly or indirectly understood through the disclosure.

DESCRIPTION OF DRAWINGS

FIG. 6A shows first text according to an embodiment of the disclosure.

FIG. 6B shows first text according to another embodiment of the disclosure.

MODE FOR INVENTION

Figure 1:
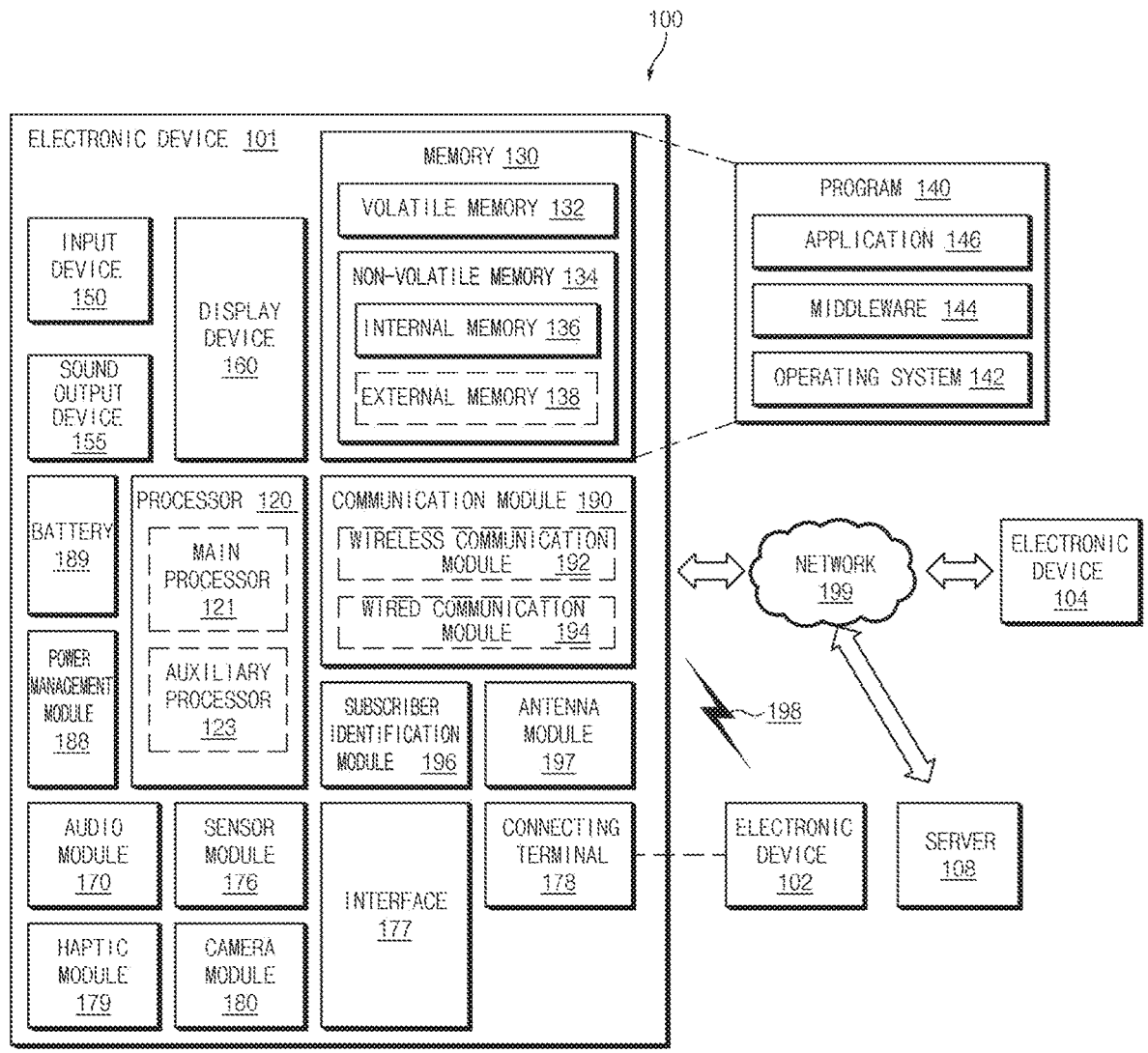
FIG. 1 is a block diagram of an electronic device in a network environment according to various embodiments.

FIG. 1 is a block diagram of an electronic device in a network environment according to various embodiments.

Referring to FIG. 1, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display).

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132, may process the loaded command or data, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121, additionally or alternatively uses less power than the main processor 121, or is specified to a designated function. In this case, the auxiliary processor 123 may operate separately from the main processor 121 or embedded.

In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134.

The program 140 may be stored in the memory 130 as software and may include, for example, an operating system 142, a middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented.

The display device 160 may be a device for visually presenting information to the user of the electronic device 101 and may include, for example, a display, a hologram device, or a projector and a control circuit for controlling a corresponding device. According to an embodiment, the display device 160 may include a touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support a designated protocol wired or wirelessly connected to the external electronic device (e.g., the electronic device 102). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 102), for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash.

The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a WiFi direct, or an IrDA (infrared data association)) or the second network 199 (e.g., the long-distance wireless communication network such as a cellular network, an internet, or a computer network (e.g., LAN or WAN)). The above-mentioned various communication modules 190 may be implemented into one chip or into separate chips, respectively.

According to an embodiment, the wireless communication module 192 may identify and authenticate the electronic device 101 using user information stored in the subscriber identification module 196 in the communication network.

The antenna module 197 may include one or more antennas to transmit or receive the signal or power to or from an external source. According to an embodiment, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 104 through the server 108 connected to the second network 199. Each of the electronic devices 102 and 104 may be the same or different types as or from the electronic device 101. According to an embodiment, all or some of the operations performed by the electronic device 101 may be performed by another electronic device or a plurality of external electronic devices. When the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may provide the requested functions or services based on the received result as is or after additionally processing the received result. To this end, for example, a cloud computing, distributed computing, or client-server computing technology may be used.

Figure 2:
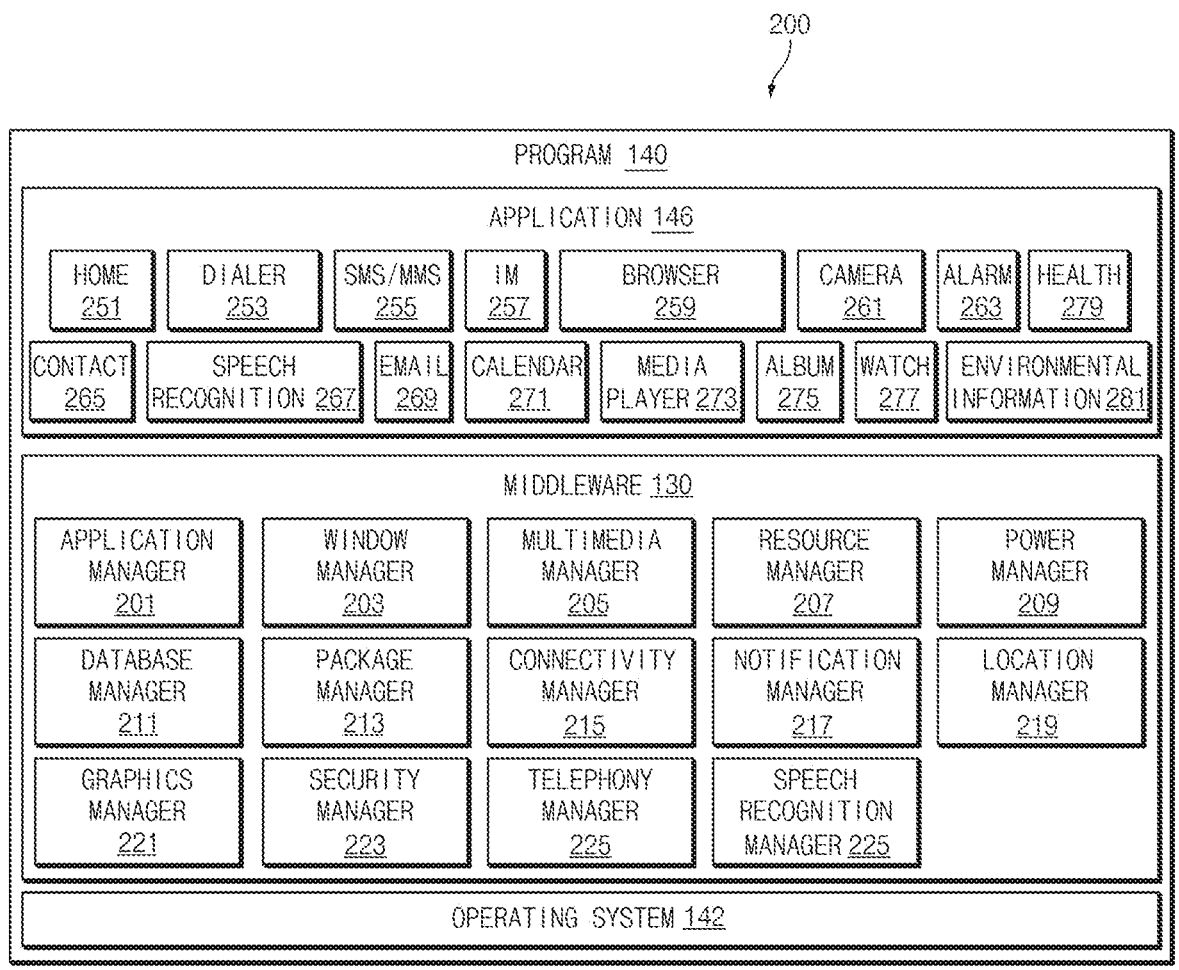
FIG. 2 is a block diagram of a program according to various embodiments.

FIG. 2 is a block diagram illustrating a program according to various embodiments.

According to an embodiment, the program 140 may include the operating system 142 for controlling one or more resources of the electronic device 101, the middleware 144, or the application 146 executable in the operating system 142. The operating system 142 may include, for example, Android™, iOS™, Windows™, Symbian™, Tizen™, or Bada™. At least some of the programs 140 may be preloaded on the electronic device 101 at the time of manufacture, for example, or downloaded from or updated by an external electronic device (e.g., the electronic device 102 or 104, or the server 108) when used by a user.

The operating system 142 may control management (e.g., allocation or retrieval) of one or more system resources (e.g., process, memory, or power) of the electronic device 101. The operating system 142 may additionally or alternatively include one or more driver programs for driving other hardware devices of the electronic device 101, such as the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that functions or information provided by one or more resources of the electronic device 101 may be used by the application 146. The middleware 144 may include, for example, an application manager 201, a window manager 203, a multimedia manager 205, a resource manager 207, a power manager 209, a database manager 211, and a package manager 213, a connectivity manager 215, a notification manager 217, a location manager 219, a graphics manager 221, a security manager 223, a telephony manager 225, or a speech recognition manager 227.

The application manager 201 may manage a life cycle of the application 146, for example. The window manager 203 may manage, for example, one or more GUI resources used in a screen. The multimedia manager 205 may identify one or more formats necessary for reproduction of media files, for example, and encode or decode a corresponding media file among the media files by using a codec corresponding to a selected format among the formats. The resource manager 207 may manage, for example, source codes of the application 146 or a memory space of the memory 130. The power manager 209 may manage, for example, the capacity, temperature, or power of the battery 189, and determine or provide related information necessary for the operation of the electronic device 101 using corresponding information among these information. According to an embodiment, the power manager 209 may interoperate with a basic input/output system (BIOS) (not shown) of the electronic device 101.

The database manager 211 may create, search, or change a database to be used by the application 146, for example. The package manager 213 may manage installation or update of an application distributed in the form of a package file, for example. The connectivity manager 215 may manage, for example, a wireless connection or direct connection between the electronic device 101 and an external electronic device. The notification manager 217 may provide a function for notifying a user of the occurrence of a specified event (e.g., an incoming call, a message, or an alarm), for example. The location manager 219 may manage location information of the electronic device 101, for example. The graphic manager 221 may manage, for example, one or more graphic effects to be provided to the user, or a user interface related thereto.

The security manager 223 may provide system security or user authentication, for example. The telephony manager 225 may manage, for example, a voice call function or a video call function provided by the electronic device 101. The speech recognition manager 227 may transmit, for example, a user's speech data to the server 108 and receive a command corresponding to a function to be performed in the electronic device based at least on a part of the speech data or text data resulted from conversion of at least a part of the speech data. According to an embodiment, the middleware 244 may dynamically delete some of existing components or add new components. According to an embodiment, at least a part of the middleware 144 may be included as a part of the operating system 142, or may be implemented as separate software different from the operating system 142.

The applications 146 may include, for example, home 251, dialer 253, SMS/MMS 255, instant message (IM) 257, browser 259, camera 261, alarm 263, contact 265, speech recognition 267, email 269, calendar 271, media player 273, album 275, watch 277, health 279 (e.g., measurement of bio information such as amount of exercise or blood sugar), or environmental information 281 (e.g., measurement of atmospheric pressure, humidity, or temperature information) applications. According to an embodiment, the applications 146 may further include an information exchange application (not shown) capable of supporting information exchange between the electronic device 101 and an external electronic device. The information exchange application may include, for example, a notification relay application configured to transfer specified information (e.g., a call, a message, or an alarm) to an external electronic device, or a device management application configured to manage an external electronic device. The notification relay application may transfer notification information corresponding to a specified event (e.g., mail reception) occurring in another application (e.g., the email application 269) of the electronic device 101 to an external electronic device, for example. Additionally or alternatively, the notification relay application may receive notification information from an external electronic device and provide the notification information to a user of the electronic device 101.

The device management application may control, for example, power (e.g., turn-on or turn-off) or a function (e.g., brightness, resolution, or focus of the display device 160 or the camera module 180) of an external electronic device that communicates with the electronic device 101 or a component (e.g., the display device 160 or the camera module 180) thereof. The device management application may additionally or alternatively support installation, deletion, or update of an application that operates on an external electronic device.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 140) including an instruction stored in a machine-readable storage media (e.g., an internal memory 136 or an external memory 138) readable by a machine (e.g., a computer). The machine may be a device that calls the instruction from the machine-readable storage media and operates depending on the called instruction and may include the electronic device (e.g., the electronic device 101). When the instruction is executed by the processor (e.g., the processor 120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Figure 3:
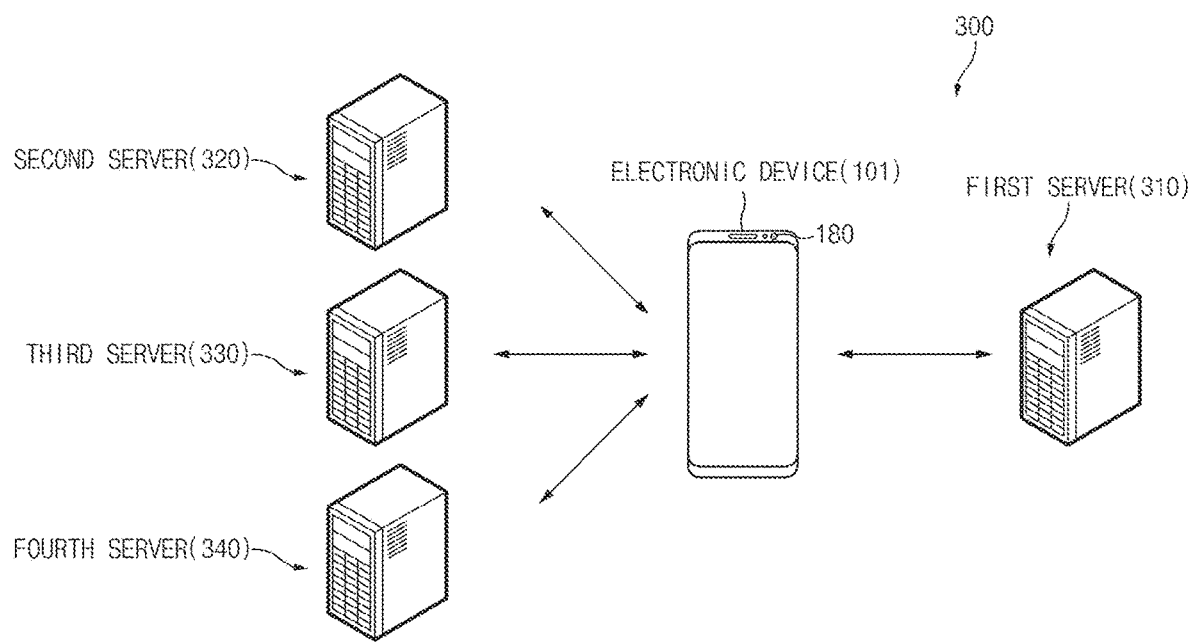
FIG. 3 illustrates a text recognition system according to an embodiment of the disclosure.

FIG. 3 illustrates a text recognition system according to an embodiment of the disclosure.

Referring to FIG. 3, a text recognition system 300 may include an electronic device (e.g., the electronic device 101 of FIG. 1), a first server 310, a second server 320, a third server 330, and a fourth server 340.

The electronic device 101 may capture an image and transmit the image to the first server 310. For example, a camera (e.g., the camera module 180 of FIG. 1) may be disposed on one surface (e.g., a front or rear surface) of the electronic device 101, and a user may photograph the user's surrounding environment through the camera 180. The electronic device 101 may transmit the photographed image to the first server 310.

The first server 310 may extract a text from the photographed image and transmit the extracted text to the electronic device 101. For example, when the photographed image is a signboard, the first server 310 may extract a shop name, a phone number, or the like written on the signboard. In another embodiment, when the photographed image represents a blackboard, the first server 310 may extract letters written on the blackboard. The extracted shop name, the phone number, letters or the like may be transmitted to the electronic device 101. In the disclosure, the first server 310 may be referred to as an optical character recognition (OCR) server.

The electronic device 101 may transmit a text received from the first server 310 to at least one of the second server 320, the third server 330, and the fourth server 340. For example, when a letter is included in the text, the electronic device 101 may transmit the text to the second server 320. In another embodiment, when a physical quantity unit is included in the text, the electronic device 101 may transmit the text to the third server 330. In still another embodiment, when a currency unit is included in the text, the electronic device 101 may transmit the text to the fourth server 340. The above-described embodiment is merely an embodiment, and a configuration included in the text, a server to which the electronic device 101 transmits a text, and the like are not limited to the above-described embodiment.

When the electronic device 101 transmits a text to the second server 320, the second server 320 may translate letters included in the text. The translated letters may be transmitted back to the electronic device 101. For example, when Chinese is included in the text, the second server 320 may translate the Chinese into Korean and transmit the text to the electronic device 101. In another embodiment, when English is included in the text, the second server 320 may translate the English into Korean and transmit the text to the electronic device 101. In the disclosure, the second server 320 may be referred to as a translation server.

The third server 330 may change a physical quantity unit. The changed physical quantity unit may be transmitted back to the electronic device 101. For example, when mile is included in a text, the third server 330 may change the mile into kilometer and transmit the converted kilometer to the electronic device 101. In another embodiment, when gallon is included in the text, the third server 330 may change the gallon to liter (l) and transmit the converted liter to the electronic device 101. In the disclosure, the third server 330 may be referred to as a unit conversion server.

The fourth server 340 may change a currency unit. The changed currency unit may be transmitted back to the electronic device 101. For example, when Dollar ($) is included in the text, the fourth server 340 may change the Dollar to Won (\) and transmit the changed Won to the electronic device 101. In another embodiment, when Yen (¥) is included in the text, the fourth server 340 may change the Yen to Won (\) and transmit the changed Won to the electronic device 101. In the disclosure, the fourth server 340 may be referred to as a currency conversion server.

When at least one of the translated letters, the changed physical quantity unit, and the changed currency unit is received from the second server 320 to the fourth server 340, the electronic device 101 may output the received text. For example, when "Hello" is included in an image photographed by the camera 180, the electronic device 100 may output "안녕" which are translated letters, instead of "Hello".

In another embodiment, an area in which the received text is output may be adjacent to the image photographed by the camera 180. For example, when "Hello" is included in an image photographed by the camera 180, the electronic device 101 may output "안녕" in a region adjacent to the image captured by the camera 180.

In the disclosure, content described with reference to FIGS. 1 to 3 may applied to components having the same reference numerals as the components of the electronic device 101 and the text recognition system 300 illustrated in FIGS. 1 to 3.

Figure 4A:
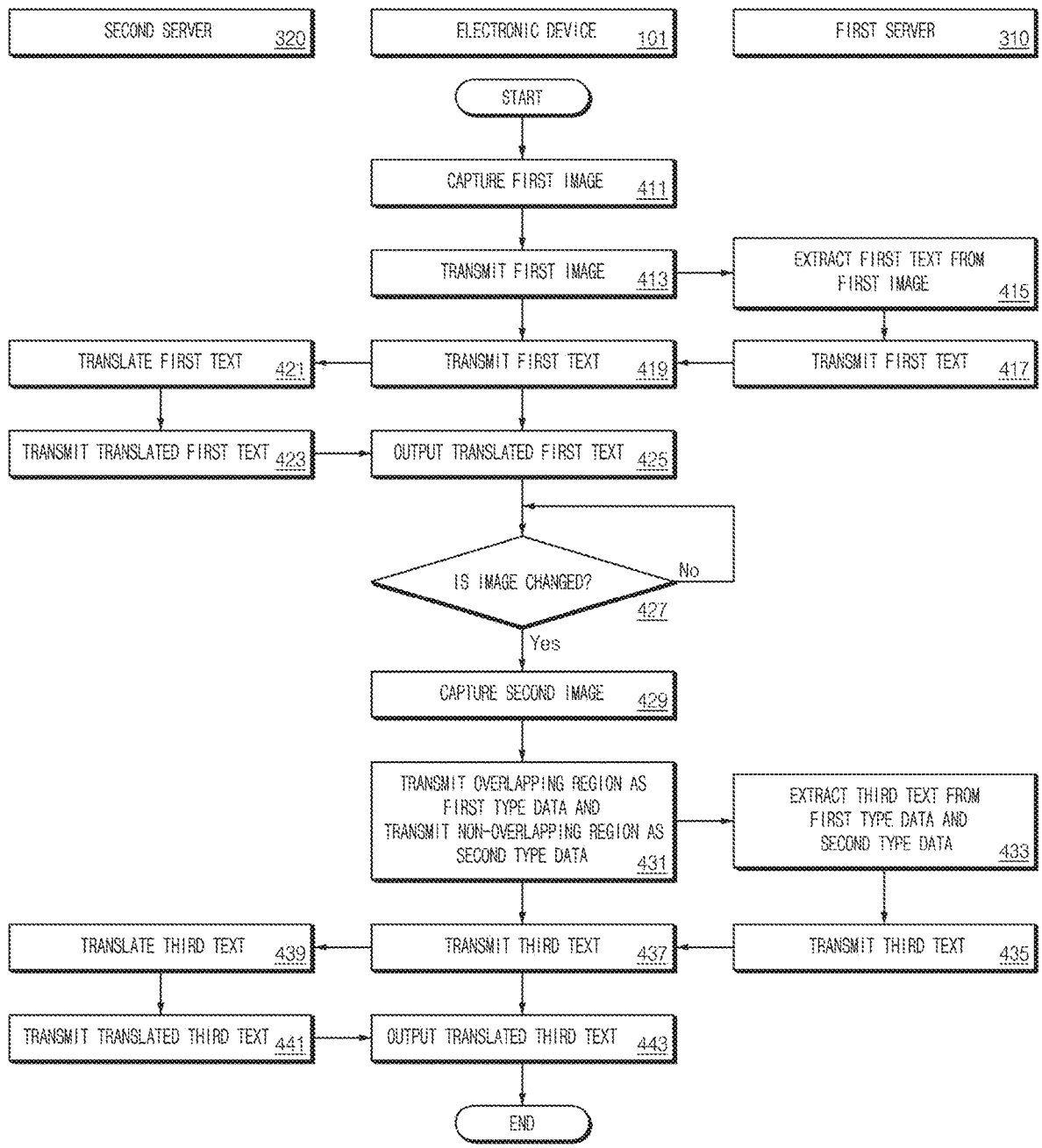
FIG. 4A is a flowchart of operation of a text recognition system according to an embodiment of the disclosure.

FIG. 4A is a flowchart of operation of a text recognition system according to an embodiment of the disclosure. FIG. 4A is a diagram for describing the operation of the components included in FIG. 3 in detail. Referring to FIG. 4A, in operation 411, the electronic device 101 (e.g., the processor 120) may capture a first image. For example, the electronic device 101 may execute an application for recognizing a text in response to a user input. When the application is executed, the electronic device 101 may photograph a user's surrounding environment through the camera 180. Further, the electronic device 101 may capture the surrounding environment. In the disclosure, the first image may mean an image captured through a display (e.g., the display device 160 of FIG. 1).

In operation 413, the electronic device 101 (e.g., the communication module 190 of FIG. 1) may transmit the captured first image to the first server 310.

In operation 415, the first server 310 may extract a first text from the first image. For example, when a signboard is included in the first image, the first server 310 may extract a shop name, a phone number, and the like written on the signboard.

In operation 417, the first server 310 may transmit the extracted first text to the electronic device 101. In the above embodiment, the first server 310 may transmit the shop name, telephone number, and the like which are extracted, to the electronic device 101. According to an embodiment, the first server 310 may transmit the extracted first text to the electronic device 101 as data having a JavaScript object notation (JSON) format.

In operation 419, the electronic device 101 may receive the first text from the first server 310 and transmit the received first text to the second server 320. Although the electronic device 101 is illustrated as transmitting the first text to the second server 320 in FIG. 4A, the electronic device 101 may transmit the first text to the third server 330 and/or the fourth server 340.

In operation 421, the second server 320 may translate the first text received from the electronic device 101. In the above embodiment, when the first text includes a Chinese shop name, the second server 320 may translate the Chinese shop name into the Korean shop name In operation 423, the second server 320 may transmit the translated first text to the electronic device 101. In the above embodiment, the second server 320 may transmit the Korean shop name to the electronic device 101.

In operation 425, the electronic device 101 may output the translated first text. In one embodiment, the electronic device 101 may output the translated first text to replace the first text. For example, the electronic device 101 may output the Korean shop name by replacing the Chinese shop name.

In operation 427, the electronic device 101 may determine whether an image output through a display (e.g., the display device 160) is changed. For example, when a user moves the electronic device 101, an image output through the camera 180 may also be changed. Accordingly, a second image may be output, not the first image.

In the disclosure, the second image may mean an image including at least a part of the first image. For example, when a signboard is included in the first image, at least a part of the signboard may be included in the second image. In other words, when the user moves the electronic device 101 within a certain range, the second image including at least a part of the first image may be output. However, when the user rotates the electronic device 101 in the opposite direction, an environment on the opposite side of the first image may be merely output through the display (e.g., the display device 160), and the first image and the second image may not be output.

When the second image is output, in operation 429, the electronic device 101 may capture the second image.

In operation 431, the electronic device 101 may compare the first image and the second image. The electronic device 101 may transmit a second text including a part of the first text corresponding to a region of the second image that overlaps the first image to the first server 310. Further, the electronic device 101 may transmit a part of the second image corresponding to a region of the second image that does not overlap the first image to the first server 310. For example, the first image may include a signboard "A", and the second image may include a part of the signboard "A" and a signboard "B". The electronic device 101 may transmit a part of the signboard "A" which is a region of the second image that overlaps the first image as first type data. The electronic device 101 may transmit the signboard "B", which is an area of the second image that does not overlap the first image, as second type data. In the disclosure, the first type data and the second type data have different formats, and the first type data may include a second text. The second type data may include a region of the second image that does not overlap with the first image.

According to an embodiment, the size of the first type data may be smaller than the size of the second type data. For example, the first type data may be transmitted to the first server 310 as data having a javascript object notation (JSON) format. The second type data may be transmitted to the first server 310 as image data (e.g., JPG data).

Meanwhile, the embodiment illustrated in FIG. 4A is merely an embodiment, and the embodiments of the disclosure are not limited to those illustrated in FIG. 4A. For example, the electronic device 101 may not transmit a region of the second image that overlaps the first image, and may transmit a region of the second image that does not overlap the first image.

According to an embodiment of the disclosure, the first type data may have a data format having a small size, thus reducing the size of data transmitted by the electronic device 101 to the first server 310. Accordingly, it is possible to shorten the time required for the electronic device 101 to output a text.

In operation 433, the first server 310 may extract a third text from the first type data and the second type data. For example, when the first image includes the signboard "A" and the second image includes a part of the signboard "A" and the signboard "B", the first server 310 may extract the third text from the first type data and the second type data corresponding to a shop name, a phone number, or the like written on the portion of the signboard "A" and the signboard "B".

In operation 435, the first server 310 may transmit the extracted third text to the electronic device 101. In the above embodiment, the first server 310 may transmit the shop name, the phone number, or the like extracted from the portion of the signboard "A" and the signboard "B" to the electronic device 101.

In another embodiment, in operation 435, the first server 310 may transmit the extracted third text to the second server 320. The second server 320 may translate the third text and transmit the translated third text to the electronic device 101. The electronic device 101 may transmit the translated third text to the third server 330 and/or the fourth server 340. The third server 330 and/or the fourth server 340 may change a physical quantity unit and/or currency unit, and transmit the changed physical quantity unit and/or currency unit to the electronic device 101.

In operations 437 to 441, the electronic device 101 may transmit the third text to the second server 320, and the second server 320 may translate the third text. The translated third text may be transmitted to the electronic device 101. The descriptions for operations 419 to 423 may also be applied to operations 437 to 441.

In operation 443, the electronic device 101 may receive the translated third text from the second server 320. The electronic device 101 may output the third text. In the above embodiment, the electronic device 101 may output a shop name written on the portion of the signboard "A" and a shop name written on the signboard "B".

Figure 4B:
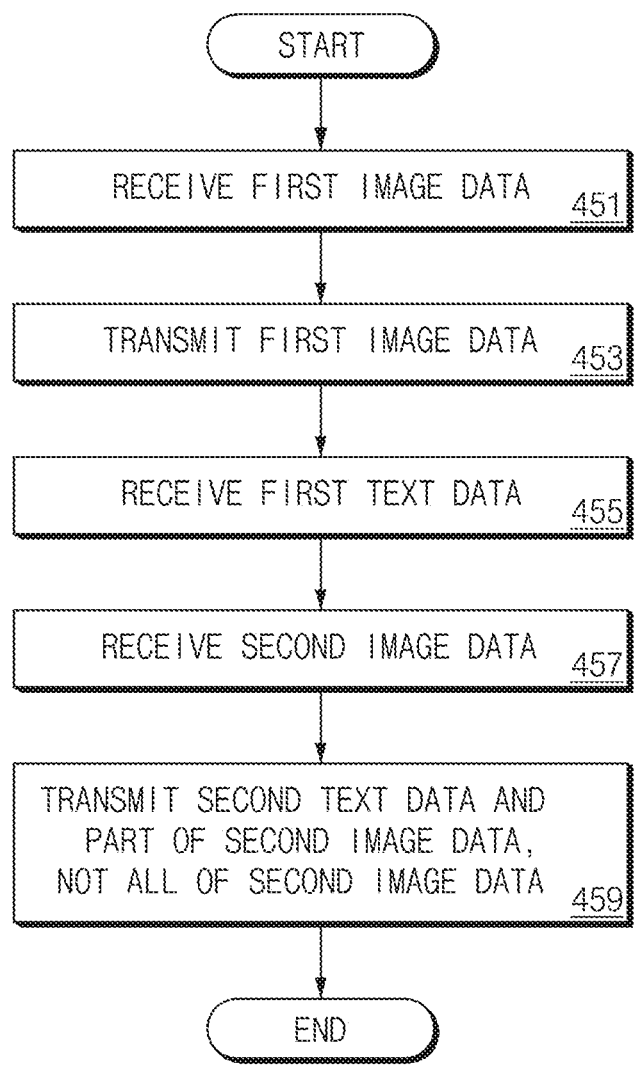
FIG. 4B is a flowchart of operation of an electronic device according to an embodiment of the disclosure.

FIG. 4B is a flowchart of operation of an electronic device according to an embodiment of the disclosure. FIG. 4B is a diagram for describing the operation of the electronic device 101 shown in FIG. 3 in detail.

Referring to FIG. 4B, in operation 451, the processor 120 may receive first image data from an imaging device. In the disclosure, the imaging device may be referred to as the camera module 180 as a device capable of generating the first image data. The first image data may mean image data including a first image output through the display 160.

In operation 453, the processor 120 may transmit the first image data to the first server 310 through the communication circuit 190. The first server 310 may extract a first text from the first image data and transmit first text data including the extracted first text back to the electronic device 101. For example, when a signboard is included in the first image, the first server 310 may extract a shop name or the like written on the signboard. The first server 310 may be referred to as an optical character recognition (OCR) server.

In operation 455, the processor 120 may receive the first text data through the communication circuit 190. When the first text data is received, the processor 120 may output the first text through the display 160. For example, when a signboard is included in the first image, the processor 120 may output the shop name written on the signboard through the display 160.

In operation 457, the processor 120 may receive second image data from the imaging device. The second image data may mean image data including a second image that overlaps the first image at least partially.

In operation 459, the processor 120 may transmit the second text data and a part of the second image data to the first server 310 through the communication circuit 190. In this document, the second text data may mean text data including at least a part of the first text data among a region where the first image and the second image overlap each other. That is, in operation 459, the processor 120 may transmit the second text data and a region of the second image data that does not overlap the first image data to the first server 310.

Figure 5:
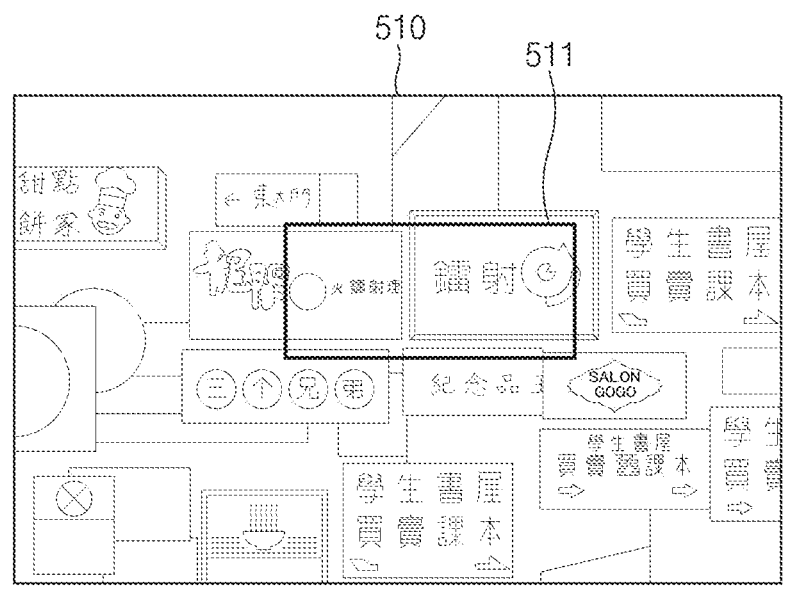
FIG. 5 illustrates a screen and a first image output through a display according to an embodiment of the disclosure.

FIG. 5 illustrates a screen and a first image output through a display according to an embodiment of the disclosure. FIG. 5 is a diagram for describing operations 411 and 413 illustrated in FIG. 4 in detail.

Referring to FIG. 5, the electronic device (e.g., the electronic device 101 of FIG. 1) may execute an application for recognizing a text in response to a user input. When the application is executed, the electronic device 101 may photograph a user's surrounding environment through a camera (e.g., the camera module 180 of FIG. 1). For example, as illustrated in FIG. 5, the user may photograph signboards 510 in a travel destination through the electronic device 101. The electronic device 101 may output the signboards 510 through a display screen.

According to an embodiment, the electronic device 101 may capture a first image 511. The first image 511 may mean an image output through the display screen. When the first image 511 is captured, the electronic device 101 may transmit the first image 511 to the first server 310.

FIG. 6A shows a first text according to an embodiment of the disclosure. FIG. 6B shows a first text according to another embodiment of the disclosure. FIGS. 6A and 6B are diagrams for describing operation 415 illustrated in FIG. 4 in detail.

Referring to FIGS. 6A and 6B, a first server (e.g., the first server 310 of FIG. 3) may extract a first text 610 having different formats from a first image (e.g., the first image 511 of FIG. 5). The extracted first text 610 may be transmitted to an electronic device (e.g., the electronic device 101 of FIG. 1). For example, as illustrated in FIG. 6A, the first server 310 may extract the first text 610, location information for the first text 610, and location information for each of words included in the first text 610, from the first image and transmit the same to the electronic device 101. In this case, the first text 610, the location information, and the location information for each word may be transmitted to the electronic device in a first type data format (e.g., a JSON format).

In another embodiment, as illustrated in FIG. 6B, the first server 310 may extract the first text 610 from the first image and display the first text 610 separately. For example, the first server 310 may analyze the first text 610 by elements of a sentence, and displays the first text 610 in units of blocks 621, lines 622, words 623, and/or letters 624.

According to an embodiment, when transmitting the first image, the electronic device 101 may transmit a command for determining a format of the first text 610 to the first server 310 together. The first server 310 may extract the first text 610 based on the command For example, the first server 310 may extract and transmit the first text 610, the location information, and the location information for each word to the electronic device 101 based on the command In another embodiment, the first server 310 may divide the first text 610 into the blocks 621, the lines 622, the words 623, and/or the letters 624 and transmit the first text 610 to the electronic device 101.

Figure 7A:
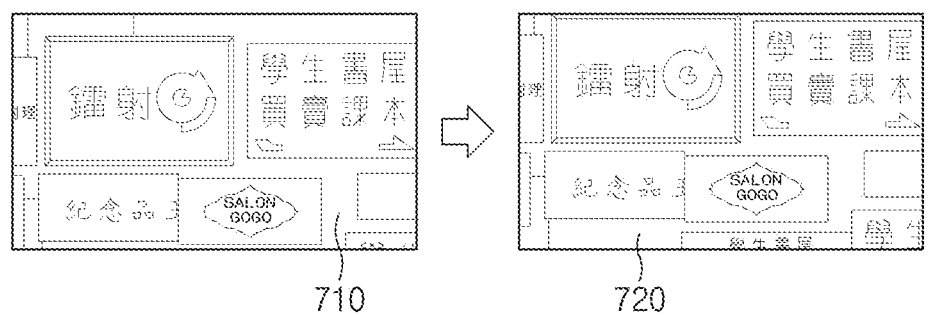
FIG. 7A is an exemplary diagram for determining whether an image is changed in an electronic device according to an embodiment of the disclosure.
Figure 7B:
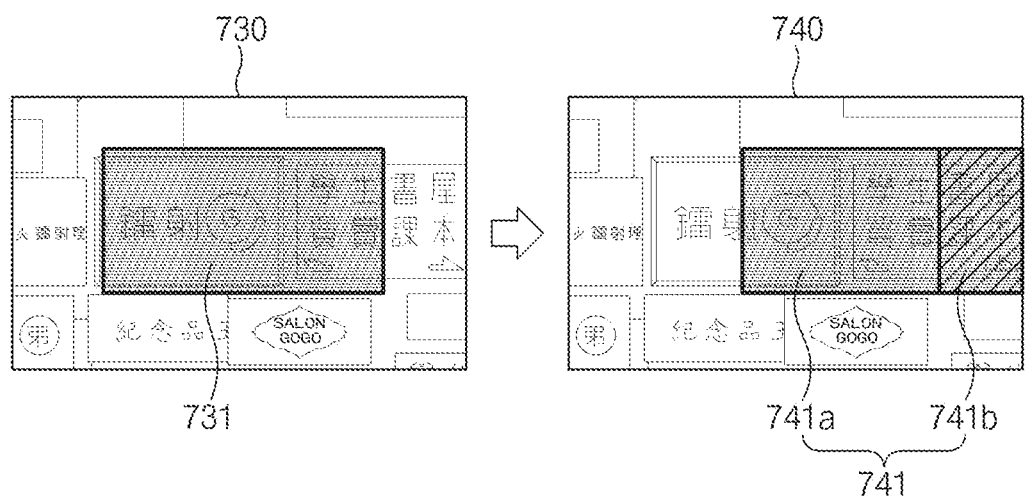
FIG. 7B is an exemplary diagram for determining whether an image is changed in an electronic device according to an embodiment of the disclosure.

FIG. 7A is an exemplary diagram for determining whether an image is changed in an electronic device according to an embodiment of the disclosure. FIG. 7B is an exemplary diagram for determining whether an image is changed according to another embodiment of the disclosure. FIGS. 7A and 7B are diagrams for describing operation 427 illustrated in FIG. 4A in detail.

Referring to FIG. 7A, an electronic device (e.g., the electronic device 101 of FIG. 1) may compare images output through a display. When there is no significant change as a result of the comparison, the electronic device 101 may not transmit a changed image to a first server (e.g., the first server 310 of FIG. 3). For example, when comparing a left image 710 and a right image 720, a text included in the left image 710 may be substantially identical to text included in the right image 720. The electronic device 101 may not transmit the right image 720 to the first server 310 because the text included in the left image 710 may be substantially identical to the text included in the right image 720.

Referring to FIG. 7B, when the image output through a display (e.g., the display device 160 of FIG. 1) is changed, the electronic device 101 may transmit the changed image to the first server 310. For example, the user may move the electronic device 101 from the left direction 730 to the right direction 740. As the electronic device is moved, a screen output through the display may also be changed. For example, a first image 731 may be output in the left direction 730, but a second image 741 may be output in the right direction 740 as the electronic device 101 is moved. The second image 741 may include both a region 741a that overlaps the first image and a region 741b that does not overlap the first image.

Figure 8A:
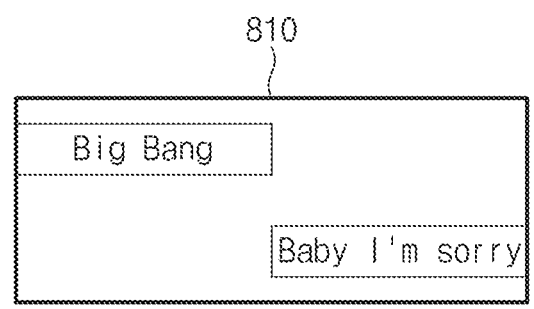
FIG. 8A shows a first image according to an embodiment of the disclosure.
Figure 8B:
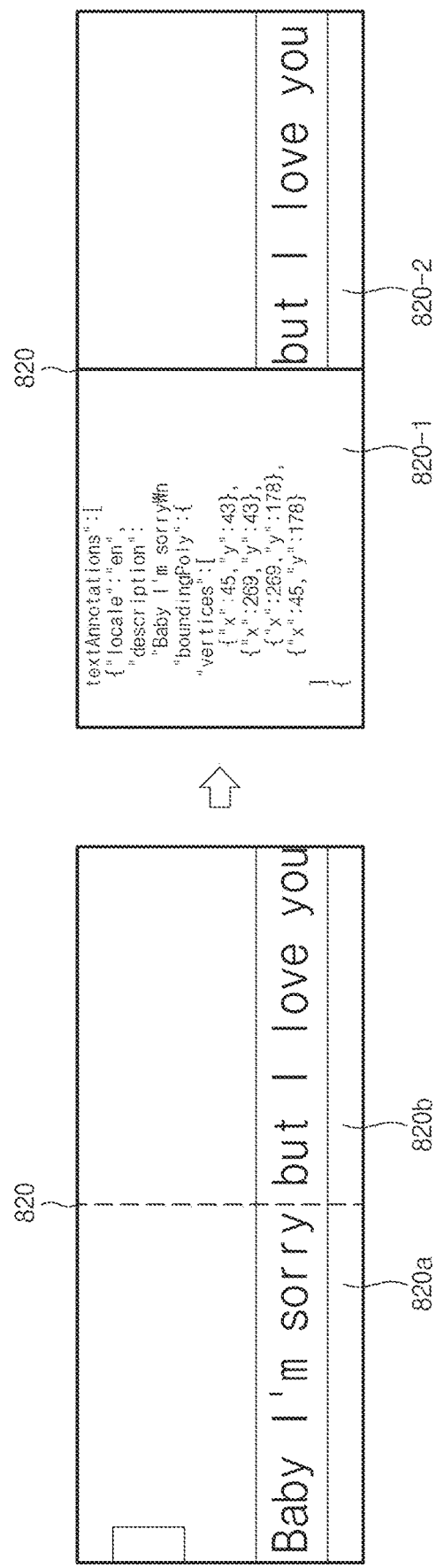
FIG. 8B shows a second image according to an embodiment of the disclosure.

FIG. 8A shows a first image according to an embodiment of the disclosure. FIG. 8B shows a second image according to an embodiment of the disclosure. FIGS. 8A and 8B are diagrams for describing operation 431 illustrated in FIG. 4 in detail.

Referring to FIGS. 8A and 8B, an electronic device (e.g., the electronic device 101 of FIG. 1) may compare a first image 810 (e.g., the first image 731 of FIG. 7A) and a second image 820 (e.g., the second image 741 of FIG. 7B) and transmit a region 820a of the second image 820 that overlaps the first image 810 to a first server (e.g., the first server 310 of FIG. 3) as first type data 820-1. The electronic device 101 may transmit a region 820b of the second image 820 that does not overlap the first image 810 to the first server 310 as second type data 820-2. For example, the left region 820a of the second image 820 may overlap the first image 810, but the right region 820b of the second image 820 may not overlap the first image 810. Accordingly, the electronic device 101 may transmit the left region 820a to the first server 310 as data 820-1 having a JSON format. The electronic device 101 may transmit the right region 820b to the first server 310 as image data 820-2 (e.g., JPG data).

Meanwhile, the embodiment illustrated in FIGS. 8A and 8B is merely an embodiment, and the embodiments of the disclosure are not limited to those illustrated in FIGS. 8A and 8B. For example, the electronic device 101 may not transmit the left region 820a of the second image 820, and may transmit the right region 820b of the second image 820 to the first server 310.

According to an embodiment of the disclosure, an image that has already been transmitted to the first server 310 may be transmitted to the server in a small data format or not transmitted to the server, thus reducing the size of data transmitted by the electronic device 101. Accordingly, it is possible to shorten the time required for the electronic device 101 to output a text.

According to an embodiment, after receiving the second image 820, the first server 310 may extract a third text from the region 820b of the second image 820 that does not overlap the first image 810. For example, because "Baby I am sorry" in the second image 820 is extracted from the first image 810, the first server 310 may not extract "Baby I am sorry" and extract "but I love you". According to a text recognition system according to a comparative example, all text included in the image may be extracted even when there is an overlapping region in the image. However, according to a text recognition system (e.g., the text recognition system 300 of FIG. 3) according to an embodiment of the disclosure, it is possible to shorten a text recognition time by extracting only a text in a non-overlapping region (e.g., 820b).

Figure 9:
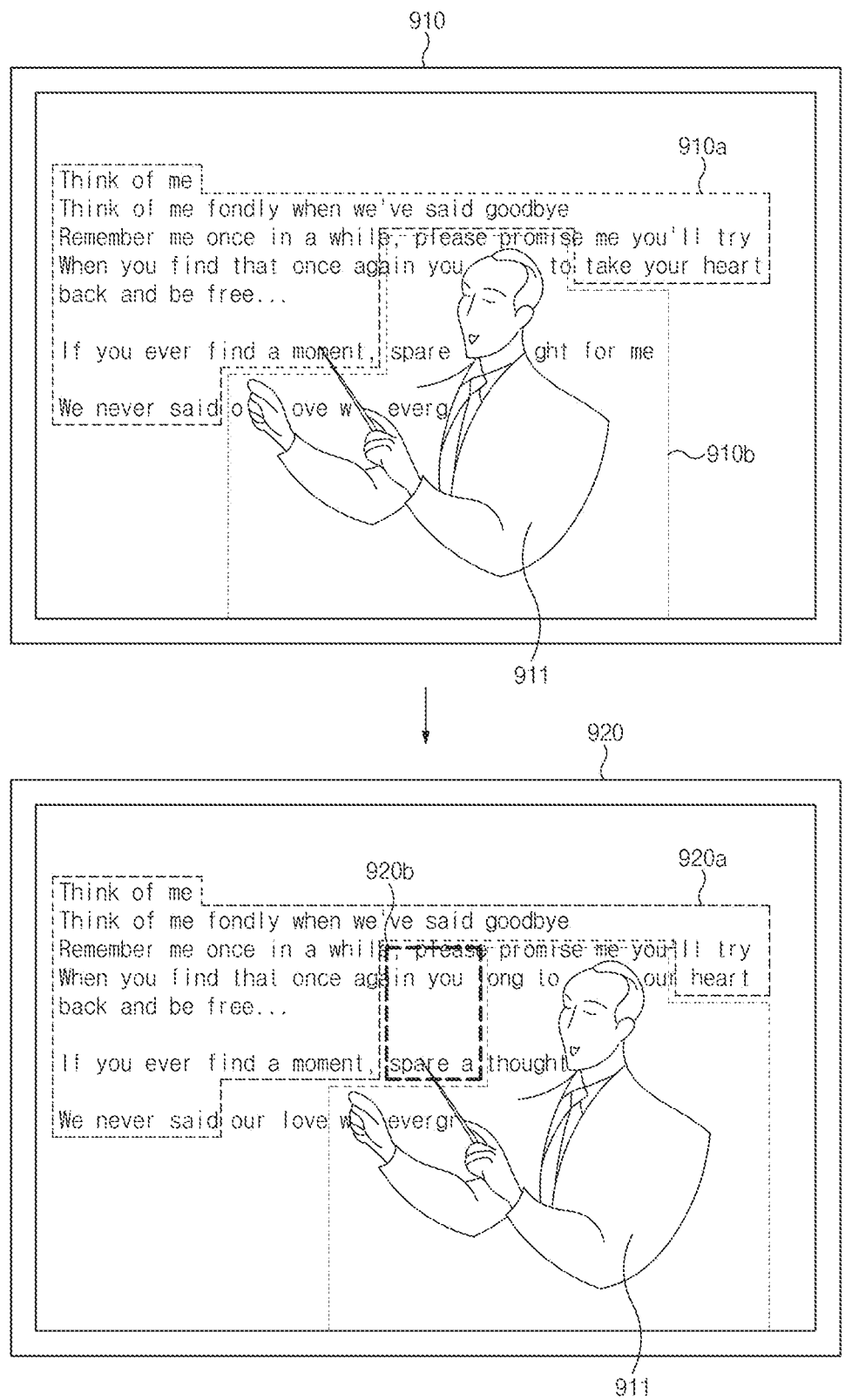
FIG. 9 shows an operating environment of an electronic device according to an embodiment of the disclosure.

FIG. 9 shows an operating environment of an electronic device according to an embodiment of the disclosure. FIG. 9 is a diagram for describing operation 431 illustrated in FIG. 4 in detail.

Referring to FIG. 9, a user may photograph an environment in which a lecturer (hereinafter, referred to as an object 911) gives a lecture in front of a blackboard during class time through an electronic device (e.g., the electronic device 101 of FIG. 1). In this case, a part of the blackboard may be obscured by the object 911. The electronic device 101 may capture the photographed environment as a first image 910. The captured first image 910 may be transmitted to a first server (e.g., the first server 310 of FIG. 3), and the first server 310 may extract a text in a region 910a that is not obscured by the object 911.

According to an embodiment, as the object 911 moves, the region 910b that is obscured by the object 911 may be changed. In this case, the electronic device 101 may capture a screen in the state where the object 911 has moved as a second image 920. The electronic device 101 may compare the first image 910 and the second image 920 and, as a result of the comparison, transmit the region 920a where the first image 910 overlaps the second image 920 as first type data (e.g., data having a JSON format) to the first server 310. The electronic device 101 may transmit a non-overlapping region 920b that is resulted from the comparison to the first server 310 as second type data (e.g., JPG data). The first server 310 may extract a text from the non-overlapping region 920b.

Meanwhile, the embodiment illustrated in FIG. 9 is merely one embodiment, and the embodiments of the disclosure are not limited to those illustrated in FIG. 9. For example, a region where the first image 910 overlaps the second image may not be transmitted to the first server 310, and a region where the first image 910 does not overlap the second image may be transmitted to the first server 310.

According to an embodiment of the disclosure, an image that has already been transmitted to the server may be transmitted to the server in a small data format or not transmitted to the server, thus reducing the size of data transmitted by the electronic device 101. Accordingly, it is possible to shorten the time required for the electronic device 101 to output a text.

The invention claimed is:

1. An electronic device comprising:
    an imaging device configured to generate image data;
    a communication circuit;
    at least one processor operatively connected to the imaging device and the communication circuit; and
    a memory operatively connected to the processor to store instructions, wherein the instructions cause, when executed, the processor to:
        receive first image data including a first image from the imaging device, the first image comprising text,
        transmit the first image data to an optical character recognition (OCR) server through the communication circuit,
        receive a first text data, including a first text recognized from the first image data, from the OCR server through the communication circuit,
        receive second image data, including a second image from the imaging device, the second image including a first region that overlaps a part of the first image and a second region that does not overlap the first image; and
        compare the first image and the second image,
        transmit a second text data and a part of the second image data, not all of the second image data, to the OCR server through the communication circuit, and
        receive a third text data, including a third text recognized from the transmitted second text data and the part of the second image data, from the OCR server through the communication circuit, wherein the second text data is a text data including at least a part of the first text data corresponding to the first region of the second image that overlaps the part of the first image, and wherein the part of the second image data represents the second image data corresponding to the second region.

2. The electronic device of claim 1, wherein the first text data has a javascript object notation (JSON) format.

3. The electronic device of claim 2, wherein the first text data includes data about at least one coordinates related to the first text in the first image.

4. An The electronic device of claim 1, further comprising:
a display configured to output an image recognized through a camera,
wherein the imaging device is the camera, and
wherein the instructions cause, when executed, the processor to:
capture the first image output through the display in response to a user input for executing an application.

5. The electronic device of claim 4,
wherein the first text includes a first currency unit, and
wherein the instructions cause, when executed, the processor to transmit the first text to an external server, receive a second currency unit obtained by changing the first currency unit to a specified unit from the external server, and output the second currency unit through the display.

6. The electronic device of claim 4, wherein the instructions cause, when executed, the processor to:
transmit the first text to an external server, and
receive a first translated text, obtained by converting the first text into a specified language, from the external server and output the first translated text through the display.

7. The electronic device of claim 6, wherein the instructions cause, when executed, the processor to:
transmit the third text to the external server, and
receive a second translated text, obtained by converting the third text into the specified language, from the external server and output the second translated text through the display.

8. The electronic device of claim 4,
wherein the first text includes a first physical quantity unit, and
wherein the instructions cause, when executed, the processor to transmit the first text to an external server, receive a second physical quantity unit obtained by changing the first physical quantity unit to a specified unit from the external server, and output the second physical quantity unit through the display.

9. The electronic device of claim 1, wherein the first image comprises an image taken at a first point in time, the second image comprises an image taken at a second point in time, and the second image data comprises data visible in the second image and obscured in the first image by an external object.

10. A method for recognizing characters in an electronic device comprising:
receiving first image data including a first image from an imaging device, the first image comprising text;
transmitting the first image data to an optical character recognition (OCR) server through a communication circuit;
receiving a first text data, including a first text recognized from the first image data, from the OCR server through the communication circuit;
receiving second image data, including a second image from the imaging device, the second image including a first region that overlaps a part of the first image and a second region that does not overlap the first image;
comparing the first image and the second image;
transmitting a second text data and a part of the second image data, not all of the second image data, to the OCR server through the communication circuit; and
receiving a third text data, including a third text recognized from the transmitted second text data and the part of the second image data, from the OCR server through the communication circuit,
wherein the second text data is a text data including at least a part of the first text data corresponding to the first region of the second image that overlaps the part of the first image, and
wherein the part of the second image data represents the second image data corresponding to the second region.

11. The method of claim 10, wherein the first text data has a javascript object notation (JSON) format.

12. The method of claim 11, wherein the first text data includes data about at least one coordinates related to the first text in the first image.

* * * * *